UNITED STATES PATENT OFFICE.

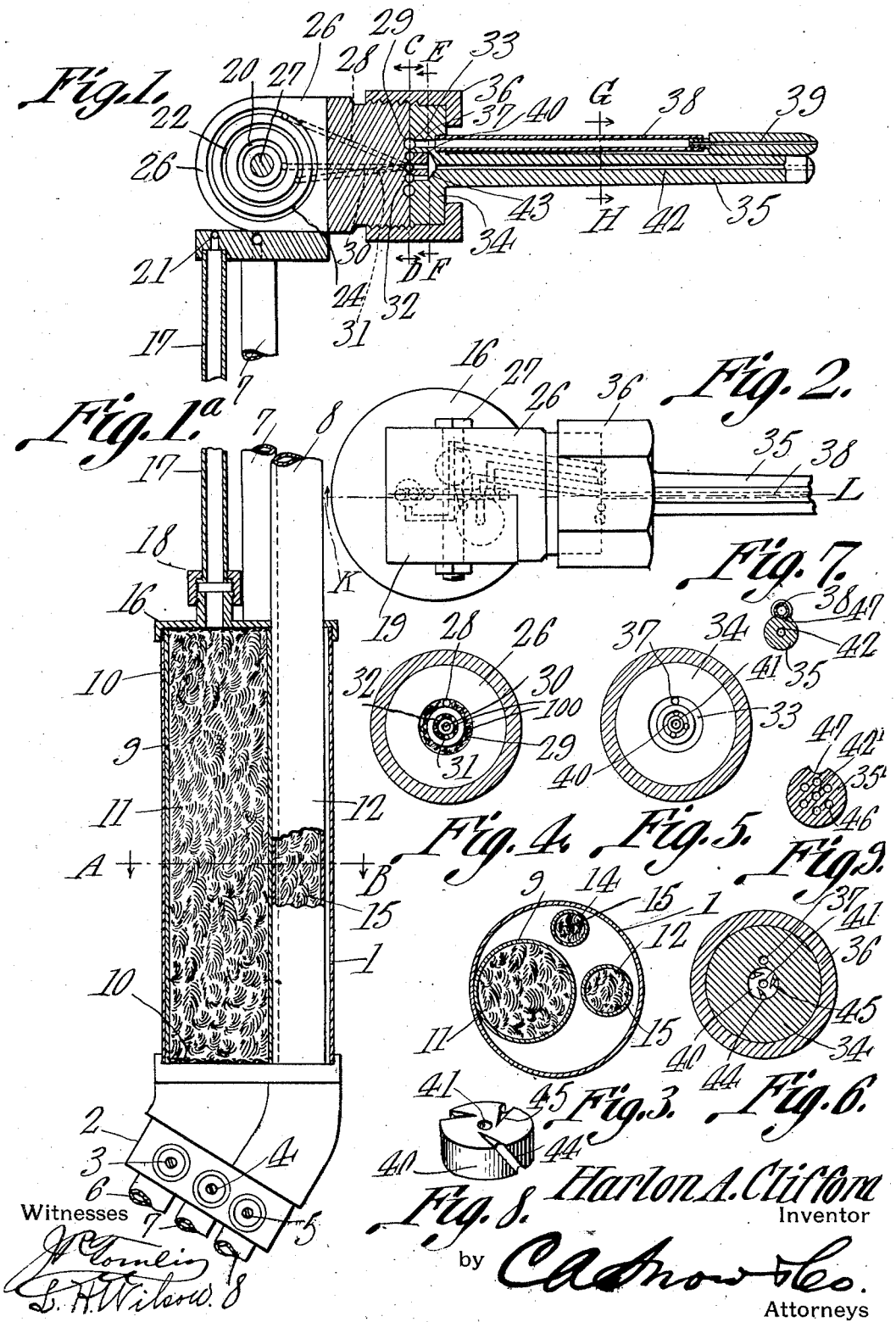

HARLON A. CLIFFORD, OF JERSEY CITY, NEW JERSEY.

TORCH.

1,016,613.     Specification of Letters Patent.     Patented Feb. 6, 1912.

Application filed January 31, 1911. Serial No. 605,741.

*To all whom it may concern:*

Be it known that I, HARLON A. CLIFFORD, a citizen of the United States, residing at Jersey City, in the county of Hudson and State of New Jersey, have invented a new and useful Torch, of which the following is a specification.

The device forming the subject matter of this application is a torch adapted to be employed for applying a mixture of oxygen and gaseous fuel to a material, for the purpose of welding and for cutting the same.

The invention aims to provide a torch of this character in which the angle between the burner and the handle may be changed without interfering with the flow of fluid through the handle and to the burner.

A further object of the invention is to provide novel means for securing a thorough mixture of gaseous fuel and oxygen in the mixing chamber of the burner.

The invention is designed, moreover, to provide a torch having separable cutting and welding elements, each provided with an individual fluid supply.

Another object of the invention is to provide means for preventing a flash-back of the ignited fluids.

Novel means are supplied for assembling the various elements of the torch in operative relation to one another.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a section of the burner, the burner-support and a portion of the handle, upon the line K—L of Fig. 2, parts appearing in elevation; Fig. 1ª is a sectional elevation of a portion of the handle, Figs. 1 and 1ª being complemental and showing the handle and the burner of the torch rectangularly disposed; Fig. 2 is a top plan showing a portion of the burner, the burner-support, and that portion of the handle to which the burner-support is immediately pivoted; Fig. 3 is a transverse section through the casing portion of the handle, upon the line A—B of Fig. 1ª; Figs. 4 and 5 are sections upon the line C—D of Fig. 1, looking to the left in Fig. 4 and to the right in Fig. 5; Fig. 6 is a section on the line E—F of Fig. 1; Fig. 7 is a section on the line G—H of Fig. 1; Fig. 8 is a detail perspective view of the plug which is inserted into the mixing chamber of the burner for the purpose of securing a thorough mixture of gaseous fuel and oxygen; and Fig. 9 is a section through a modified form of primary nozzle, the cutting plane passing through such modified structure in approximately the same place as that in which the plane G—H passes through the structure shown in Fig. 1.

The torch herein disclosed comprises three fundamental parts; a handle, a burner-support and a burner. The handle and the burner-support are pivotally united so that the angular relation between them may be altered; and the burner is detachably secured to the burner-support. These fundamental parts will be described in order.

*The handle.*—The handle is a composite structure and includes a tubular casing 1, provided at one end with a base 2, and at the other end with a cap 16. Located within the casing 1 is a tube 9 of less diameter than the casing. The tube 9 extends from the base 2 to the cap 16, the ends of the tube being supplied with wire gauze closures 10, retaining in place within the tube a packing 11 of asbestos or the like. A gas supply pipe 6, controlled by a valve 3, enters the base 2 and communicates with the interior of the tube 9. Oxygen pipes 7 and 8 enter the base 2, the pipe 7 being controlled by a valve 4 and the pipe 8 being controlled by a valve 5. As shown at 12 the pipe 8 passes through the casing 1 and out of the cap 16, the pipe 8 entering a head 19, constituting a part of the handle of the torch. The pipe 7, as shown at 14, passes through the casing 1 and enters the head 19. Communication is established between the tube 9 and the head 19 by means of a pipe 17, united with the cap 16 by a connection 18. The parts 12 and 14 of the pipes 8 and 7 respectively, are packed with asbestos, as shown at 15. The packings 11 and 15 serve to prevent a flash-back of the ignited fluids which the pipes 6, 7 and 8 conduct. In one of the side faces of the head 19 there are concentric annular grooves 20, 22 and 24. A duct 21 in the head 19 serves to establish communication between the pipe 17 and the groove 20, another duct 23 connecting the pipe 7 with the groove 22, and a third duct 25 connecting the pipe 8 with the groove 24.

*The burner-support.*—The burner-support 26 is shown in the form of a block adapted to fit closely against the grooved face of the head portion 19 of the handle. In the face of the burner-support 26 there are concentric annular grooves, registering respectively with the grooves 20, 22 and 24 of the head 19. A pivot element 27 connects the burner-support 26 with the head portion 19 of the handle, so that the burner-support and the handle may assume different relative angles. Owing to the fact that the grooves 20, 22 and 24 of the head are concentric with the corresponding grooves in the burner-support, the fluid conduits through the handle and the burner-support will remain continuous when the burner-support is swung about upon its pivotal connection 27 with the head 19.

In the outer end face of the burner-support 26 there is an annular groove 29 concentric with another annular groove 32, of smaller diameter than the groove 29. A passage 28 in the burner-support 26 serves to establish communication between the groove 29 upon the one hand, and the groove 24 in the head 19 and the registering groove in the burner-support 26 upon the other hand. A passage 31 in the burner-support 26 serves to establish communication between the groove 32 upon the one hand, and the groove 22 in the head 19 and the registering groove in the burner-support 26 upon the other hand. There is a third passage 30 in the burner-support 26, this passage opening at one end into the groove 20 in the head 19 and into the registering groove in the burner-support 26, and at the other end opening through the end wall of the burner-support at the center of the grooves 29 and 32.

*The burner.*—The burner includes a primary nozzle 35 having at one end a lateral flange 34 abutting against the end wall of the burner-support 26. The primary nozzle 35 is removably held upon the burner-support 26 by a collar 36, overlapping the outer face of the flange 34 and threaded upon the burner-support 26. The bore 42 of the primary nozzle 35 is enlarged within the flange 34 of the primary nozzle to form a mixing chamber 43. In the mixing chamber 43 is located a plug 40 having an axial passage 41 communicating at one end with the forward portion of the mixing chamber 43, and at the other end communicating with the passage 30 in the burner-support 26. In the side wall of the plug 40 there are diagonal grooves 44 communicating at their rear ends with the annular groove 32 in the outer end face of the burner-support 26, and at their forward ends opening into the forward portion of the mixing chamber 43, these grooves 44 being extended across the outer end face of the plug 40, as shown at 45. The burner further includes a secondary nozzle, comprising a tube 38 seated in a longitudinal groove 47 in the side face of the primary nozzle 35, the tube 38 being removably connected with the flange 34 of the primary nozzle 35. The tube 38 of the secondary nozzle carries a removable cutting tip 39, having a reduced bore communicating with the bore of the tube 38. The bore of the tube 38 opens into a passage 37 through the flange 34 of the primary nozzle 35, the passage 37 opening into an annular groove 33 in the rear face of the flange 34, the groove 33 registering with the groove 29 in the outer end face of the burner-support 26. The registering grooves 29 and 33, and the groove 32, may contain a packing 100 of asbestos and metallic gauze, for the purpose of preventing a flash-back of the ignited fluids.

*Operation.*—Presupposing that the controlling valves 3, 4 and 5 are open, the gas which is to be burned will enter the pipe 6 and pass thence through the tube 9 to the pipe 17 and by way of the duct 21 into the annular groove 20, and by way of the passage 30 in the burner-support 26, to the central passage 41 in the plug 40, and into the mixing chamber 43 in front of the plug 40. From the mixing chamber 43, the gas will pass through the bore 42 of the primary nozzle 35, to the extremity of the primary nozzle, at which point the gas will be ignited. The oxygen entering the pipe 7, will pass through the casing 1 and traverse the duct 23 to enter the groove 22. From the groove 22 the oxygen will traverse the passage 31 and enter the groove 32, passing thence by way of the inclined grooves 44 in the side face of the plug 40 into the mixing chamber 43, and thence with the gas which is simultaneously delivered into the mixing chamber, through the bore 42 of the primary nozzle 35. Owing to the positions of the grooves 44 in the side walls of the plug 40 and owing to the fact that these grooves extend across the end face of the plug as shown at 45, the oxygen will be given a spiral motion as it enters the mixing chamber 43, a thorough admixture of gas and oxygen being thereby effected. The path traversed by the oxygen supplied to the cutting tip 39 is as follows; the pipe 8, the duct 25, the annular groove 24 in the head 19 and its fellow in the burner-support 26, the passage 28, the registering annular grooves 29 and 33 in the burner-support 26 and in the flange 34 of the primary nozzle 35 respectively, the passage 37 through the flange 34, the bore of the tube 38 of the secondary nozzle, and out through the bore of the cutting tip 39 of the secondary nozzle.

When the torch is to be used for welding, the secondary nozzle 38—39 may be removed, the valve 5 being closed. When the torch is to be used for cutting purposes, the secondary nozzle 38—39 will remain in place as shown in Fig. 1. The longitudinal grooving of the primary nozzle 35 at 47 to receive the tube 38 of the secondary nozzle, serves to hold the ignition ends of the two nozzle portions of the burner assembled for operation upon the material.

*Modification.*—In the modified form shown in Fig. 9, the primary nozzle 35' alone is changed, the nozzle 35' having the same functions as the primary nozzle 35 of Fig. 1. The nozzle 35' is equipped with an axial bore 42', corresponding to the bore 42 of the nozzle 35. About the bore 42' are disposed supplemental bores 46. All of the bores 42' and 46 are for a single purpose, to wit, to serve as conduits which carry a mixture of gas and oxygen from the mixing chamber 43 to the outer end of the primary nozzle 35', this mixture of gas and oxygen passing, in the structure shown in Fig. 1, through the single bore 42 of the primary nozzle 35.

Having thus described the invention, what I claim as new and desire to protect by Letters Patent is:

1. In a device of the class described, a handle including a head having annular grooves in one of its faces, and pipes connected with the head, each pipe communicating with a groove to form oxygen and gas conduits; a burner support having annular grooves in one of its faces, registering with the grooves of the head; means for binding the head and the burner-support together for relative angular movement and to hold the grooves of the head and of the burner-support in registration; and a burner carried by the burner-support, the burner having separate bores, each bore communicating with a registering pair of the grooves.

2. In a device of the class described, a burner-support; a burner including a primary nozzle and a secondary nozzle removably secured to the primary nozzle; means for removably securing the burner to the burner-support; a handle with which the burner-support is pivotally connected; and means for conveying fluid through the handle to the nozzles, irrespective of the relative positions of the burner-support and the handle.

3. In a device of the class described, a burner-support; a burner removably secured thereto, the burner including a primary nozzle and a secondary nozzle removably secured to the primary nozzle, the secondary nozzle including a removable tip; a handle pivotally connected with the burner-support, there being separate fluid conduits and an independent conduit, all leading through the handle and through the burner-support, the separate conduits communicating with the primary nozzle and the independent conduit communicating with the secondary nozzle, there being registering annular grooves in the burner-support and in the handle, constituting parts of the conduits, whereby the continuity of the conduits will be maintained, irrespective of the relative positions of the handle and the burner-support.

4. In a device of the class described, a burner including a primary nozzle having a lateral flange and a longitudinal groove, and a secondary nozzle fitting in the groove and removably engaged with the flange, the secondary nozzle including a removable tip; a burner-support; means for securing the flange to the burner-support; and independent conduits in the burner-support, each of which communicates with the bore of one nozzle.

5. In a device of the class described, a nozzle provided with a bore terminally enlarged to form a mixing chamber; and a plug removably seated in the mixing chamber and having diagonally disposed grooves in its side face, extended upon the end face of the plug within the mixing chamber, there being an opening in the interior of the plug, communicating with the mixing chamber.

6. In a device of the class described, a burner-support and a burner disposed in terminal abutment, there being registering annular grooves in the meeting faces of the burner-support and the burner; a packing in the grooves; means for supplying fluid to the grooves on one side of the packing; and means for establishing communication between the bore of the burner and the grooves upon the other side of the packing.

7. In a device of the class described, a burner-support and a handle having registering annular grooves in their faces; means for binding the burner-support and the handle together for relative angular movement, and for holding said faces in intimate contact, to maintain the grooves in registration; and a burner carried by the burner-support, the burner and the burner-support having communications with the grooves; the handle including means for supplying fluid to the grooves.

In testimony that I claim the foregoing as my own, I have hereto affixed my signature in the presence of two witnesses.

HARLON A. CLIFFORD.

Witnesses:
 Delavan Provost,
 Leo C. Clifford.